United States Patent
Cho et al.

(10) Patent No.: US 10,028,318 B2
(45) Date of Patent: Jul. 17, 2018

(54) METHOD FOR CONNECTING TO EXTERNAL DEVICES AND ELECTRONIC DEVICE IMPLEMENTING THE SAME

(71) Applicant: Samsung Electronics Co., Ltd., Suwon-si (KR)

(72) Inventors: Anki Cho, Suwon-si (KR); Jaewook Lee, Suwon-si (KR); Taieui Song, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/513,536

(22) PCT Filed: Oct. 12, 2015

(86) PCT No.: PCT/KR2015/010742
§ 371 (c)(1),
(2) Date: Mar. 22, 2017

(87) PCT Pub. No.: WO2016/060424
PCT Pub. Date: Apr. 21, 2016

(65) Prior Publication Data
US 2017/0311359 A1    Oct. 26, 2017

(30) Foreign Application Priority Data

Oct. 13, 2014 (KR) .................. 10-2014-0137834

(51) Int. Cl.
*H04B 5/00* (2006.01)
*H04W 76/10* (2018.01)
*H04W 76/02* (2009.01)
*H04W 4/00* (2018.01)
*H04W 4/80* (2018.01)
*H04W 84/12* (2009.01)

(52) U.S. Cl.
CPC ........... *H04W 76/10* (2018.02); *H04W 4/008* (2013.01); *H04W 4/80* (2018.02); *H04W 76/02* (2013.01); *H04W 84/12* (2013.01)

(58) Field of Classification Search
CPC .............................. H04W 4/008; H04W 76/02
USPC ................................................. 455/41.1, 41.2
See application file for complete search history.

(56) References Cited

U.S. PATENT DOCUMENTS

| | | | |
|---|---|---|---|
| 8,498,572 B1* | 7/2013 | Schooley | H04B 5/0031 340/10.51 |
| 2010/0004005 A1* | 1/2010 | Pereira | H04W 4/02 455/457 |
| 2010/0195539 A1* | 8/2010 | Tian | H04L 47/824 370/255 |
| 2010/0197229 A1 | 8/2010 | Yamashita | |

(Continued)

OTHER PUBLICATIONS

Communication from a foreign patent office in a counterpart foreign application, European Patent Office, "Supplementary European Search Report," European Patent Application No. 15850104.9, dated Mar. 19, 2018, 8 pages.

*Primary Examiner* — Ayodeji Ayotunde

(57) ABSTRACT

According to various embodiments of the present invention, a method for connecting to external devices by using a near-field communication module in an electronic device may include: obtaining external device information for connecting to the external devices, connecting to the external devices by using the obtained external device information, and controlling the connected external devices.

17 Claims, 17 Drawing Sheets

(56) References Cited

U.S. PATENT DOCUMENTS

| | | |
|---|---|---|
| 2011/0166628 A1* | 7/2011 | Jain .................. A61N 1/08 607/60 |
| 2014/0004793 A1 | 1/2014 | Bandyopadhyay et al. |
| 2014/0066062 A1 | 3/2014 | Chen et al. |
| 2014/0073244 A1 | 3/2014 | Ko et al. |
| 2014/0173069 A1 | 6/2014 | Kim et al. |
| 2014/0178028 A1 | 6/2014 | Park et al. |
| 2014/0192986 A1 | 7/2014 | Lee et al. |

\* cited by examiner

FIG. 9A

TARGET DEVICE LIST — 910

| ✴ DEVICE 1 | ☑ |
| ((· DEVICE 2 | ☐ |
| ((· DEVICE 3 | ☑ |
| NFC DEVICE 4 | ☐ |
| ✴ DEVICE 5 | ☐ |
| ((· DEVICE 6 | ☑ |
| ((· DEVICE 7 | ☐ |

CONNECT | GROUP — 920 | CANCEL

FIG. 9B

GROUP SETTING

✴ DEVICE 1
((· DEVICE 3
((· DEVICE 6

— 930

STORE — 940 | CANCEL

METHOD FOR CONNECTING TO EXTERNAL DEVICES AND ELECTRONIC DEVICE IMPLEMENTING THE SAME

CROSS-REFERENCE TO RELATED APPLICATION(S)

The present application claims priority under 35 U.S.C. § 365 to International Patent Application No. PCT/KR2015/010742 filed Oct. 12, 2015, entitled "METHOD FOR CONNECTING TO EXTERNAL DEVICES AND ELECTRONIC DEVICE IMPLEMENTING THE SAME", and, through International Patent Application No. PCT/KR2015/010742, to Korean Patent Application No. 10-2014-0137834 filed Oct. 13, 2014, each of which are incorporated herein by reference into the present disclosure as if fully set forth herein.

TECHNICAL FIELD

Various embodiments of the present invention relate to an electronic device having a near-field communication function and a method for connecting to a plurality of external devices by using the function.

BACKGROUND ART

Portable electronic devices such as a smartphone and a tablet PC can have a function of performing a wireless data communication with an external device located in a short distance (i.e., in surrounding areas). For example, the electronic device may include an NFC (Near-field Communication) module, Wi-Fi (Wireless Fidelity) module, or Bluetooth module.

DISCLOSURE OF INVENTION

Technical Problem

An electronic device can connect to an external device located in a close distance and perform wireless data communication with the connected external device. For example, a connecting operation between devices is performed prior to the data communication. This operation may include an operation of collecting information of an external device transmitted (for example, advertised) by scanning predetermined frequency channels, operation of finding peripheral external devices communicable with the electronic device based on the collected information, and operation of completing a connection by exchanging communication information (for example, an identification (ID) and an internet protocol (IP) address) with the found external device.

The connecting operation may require a user intervention. For example, a user may select a desired near-filed communication method from various methods, select a device to be connected with a user's own device among the found devices, and input a password into the user's own device if the device to be connected is set with a password. However, in some instances, such an intervention may cause onerousness and inconvenience for the user. For example, a person not familiar to an electronic device or a disabled person may encounter difficulties in the connecting operation. Further, a person desiring communications with a plurality of peripheral devices may feel inconveniences due to repeated interventions of connecting operations.

Various embodiments of the present invention can provide a method for connecting to a plurality of external device located in circumferences and an electronic device implementing the same without generating user's onerousness or inconvenience.

Solution to Problem

According to various embodiment of the present invention, a method for connecting to external devices by using a near-field communication module in an electronic device may include: obtaining external device information for connecting to the external devices, connecting to the external devices by using the obtained external device information, and controlling the connected external devices.

According to various embodiments of the present invention, an electronic device may include: a communication unit configured to perform a near-field communication with external devices directly or through a network, a storage unit configured to store external device information for a connection with the external devices, and a processor configured to control the communication unit and the storage unit. The processor obtains external device information from the storage unit or from an information providing device through the communication unit, controls the communication unit to connect to the external devices by using the obtained external device information, and controls the connected external devices through the communication unit.

Advantageous Effects

According to various embodiments of the present invention, an electronic device can connect to a plurality of external devices without giving an onerousness or inconvenience to a user. According to various embodiments of the present invention, the electronic device (for example, a smartphone as a mater device) can read information (for example, a MAC address) of slave devices (for example, device having a Bluetooth function) from an information providing device (for example, an NFC tag), automatically connect to the slave devices by using the information, and control the slave devices. Further, the electronic device can manage information read from the NFC tag (for example, configure a database in the device by grouping corresponding information according to the types of slave devices), and share management information with other master device. The other master device can connect to slave devices by using the shared information, and control the slave devices.

BRIEF DESCRIPTION OF DRAWINGS

The above and other aspects, features, and advantages of certain embodiment of the present disclosure will be more apparent from the following description taken in conjunction with the accompanying drawings, in which:

FIGS. 9A and 9B are screen examples respectively illustrating a slave device list and a group setting;

MODE FOR THE INVENTION

Figure 1:
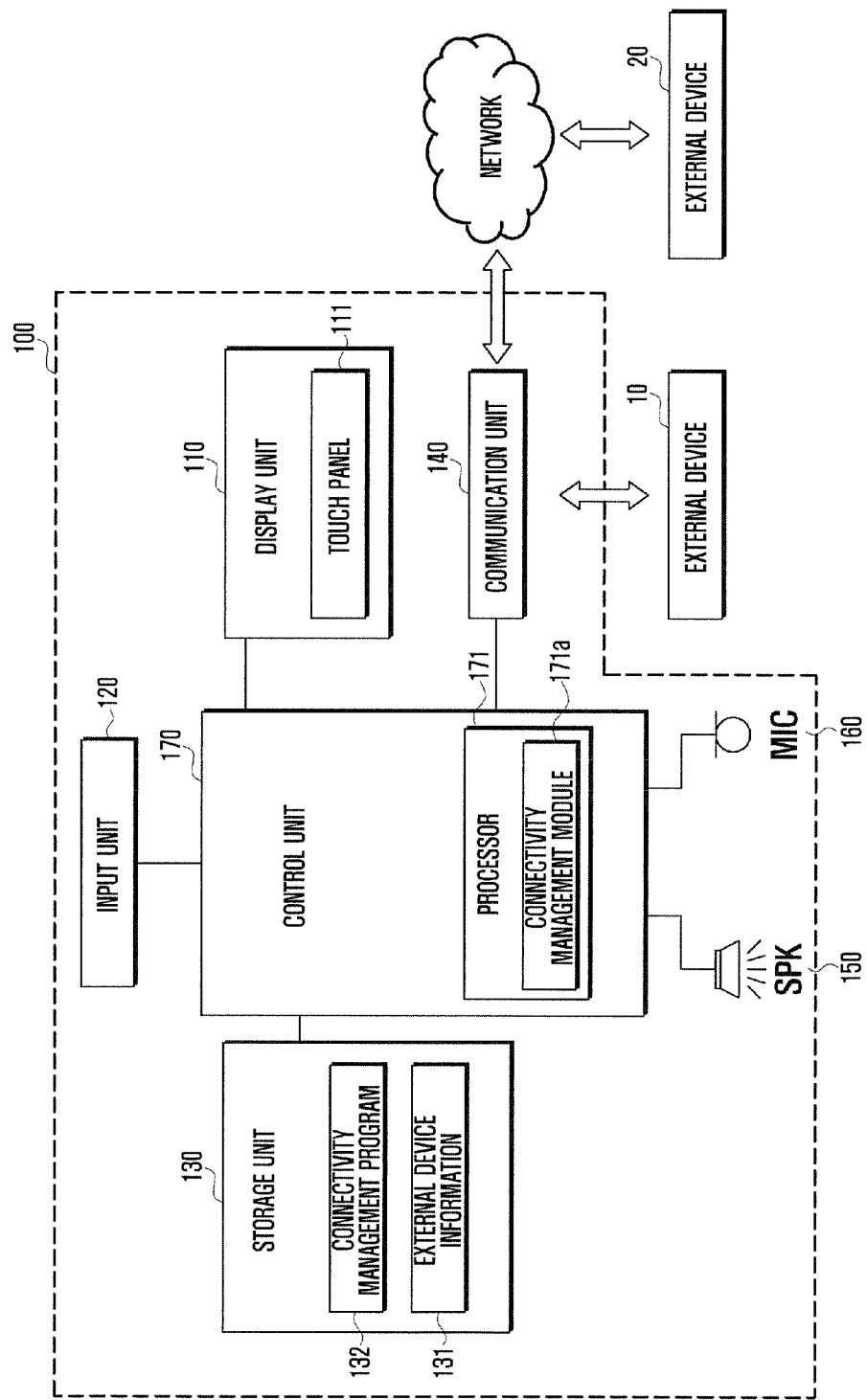
FIG. 1 is a block diagram illustrating a configuration of an electronic device according to various embodiments of the present invention.

Hereinafter, the present disclosure will be described with reference to the accompanying drawings. Although specific embodiments are illustrated in the drawings and related detailed descriptions are discussed in the present specification, the present disclosure may have various modifications and several embodiments. However, various embodiments of the present disclosure are not limited to a specific implementation form and it should be understood that the present disclosure includes all changes and/or equivalents and substitutes included in the spirit and scope of various embodiments of the present disclosure. In connection with descriptions of the drawings, similar components are designated by the same reference numeral.

The expression "comprise" or "include" used in various embodiments of the present invention indicates the existence of a corresponding function, operation or component disclosed in the present invention, and doesn't limit addition of at least one function, operation, or component. In various embodiments of the present invention, the terms "include" and "have" indicates the existence of a characteristic, numeral, step, operation, element, component, or their combinations listed in the present disclosure, and it should be understood that the terms don't exclude the possibility of existence or addition of more than one different characteristic, numeral, step, operation, element, component, or their combinations.

In various embodiments of the present invention, the expression "or" includes any or all of words listed together. For example, the expression "A or B" may include A, B, or both A and B.

The expression "1", "2", "first", or "second" used in various embodiments of the present disclosure may modify various components of the various embodiments but does not limit the corresponding components. For example, the above expressions do not limit the sequence and/or importance of the components. The expressions may be used for distinguishing one component from other components. For example, a first user device and a second user device indicate different user devices although both of them are user devices. For example, without departing from the scope of the present disclosure, a first structural element may be referred to as a second structural element. Similarly, the second structural element also may be referred to as the first structural element.

The terms used in various embodiments of the present invention is to merely describe a specific embodiment, and is not intended to limit the scopes of various embodiments of the present invention. A singular form may include a plural form unless clearly defined in a context.

Unless differently defined, all the terms including a technical or scientific term may have the same meaning as terms generally understood by those skilled in the prior art. The terms defined in a general dictionary may be interpreted as having the same or similar meaning in a context of related technology, and are not interpreted abnormally or excessively unless clearly defined in the present disclosure.

The electronic device according to various embodiments of the present invention has a near-field communication function. For example, the electronic device may include at least one of a smartphone, tablet personal computer, mobile phone, video phone, e-book reader, desktop personal computer, laptop personal computer, netbook computer, PDA (Personal Digital Assistant), PMP (Portable Multimedia Player), MP3 player, mobile medical appliances, camera, or wearable device such as a HMD (Head-Mounted-Device such as an electronic glasses), electronic clothing, electronic bracelet, electronic necklace, electronic appcessory, electronic tattoo, and smartwatch.

According to some embodiments, the electronic device may be a smart home appliance having a projection function. The smart home appliance may include at least one of a TV (TeleVision), DVD (Digital Video Disk) player, an audio player, air conditioner, cleaner, oven, microwave oven, washing machine, air cleaner, set-top box, TV box (for example, Samsung HomeSync™, Apple TV™, or Google TV™), game consoles, electronic dictionary, electronic key, camcorder, and electronic frame.

According to some embodiments, the electronic device may include at least one of various types of medical devices (for example, an MRA (Magnetic Resonance Angiography), MRI (Magnetic Resonance Imaging), CT (Computed Tomography), scanner, ultrasonic device and the like), navigation device, GPS (Global Positioning System) receiver, EDR (Event Data Recorder), FDR (Flight Data Recorder), vehicle infotainment device, electronic equipment for a ship (for example, a navigation device for ship, gyro compass and the like), avionics, security device, head unit for a vehicle, industrial or home robot, ATM (Automatic Teller Machine) of financial institutions, and POS (Point Of Sale) device for shops.

According to some embodiments, the electronic device may include at least one of furniture or a part of a building/structure, an electronic board, an electronic signature receiving device, a projector, and various types of measuring devices (for example, a water meter, electricity meter, gas meter, radio wave meter and the like) including a projection function. The electronic device according to various embodiments of the present disclosure may be one or combinations of the above described devices. Further, the electronic device according to various embodiments of the present disclosure may be a flexible device. It is apparent to those skilled in the art that the electronic device according to various embodiments of the present disclosure is not limited to the above described devices.

The term "screen" used in various embodiments of the present invention may indicate a screen of a display unit. For example, the contexts "an image is displayed in a screen", "a display unit displays an image in a screen", and "a control unit controls a display unit to display an image in a screen" are used as "a screen of a display unit". Further, the term "screen" may indicate an object displayed in a display unit. For example, in the contexts "a lock screen is displayed", "a display unit displays a lock screen", and "a control unit controls a display unit to display a lock screen", the screen is used as a display object.

In various embodiments of the present invention, an external device is an electronic device having a near-field communication function. Here, the term "external device" means another electronic device based on a specific electronic device, and it should be understood that a function or an operation of the corresponding device is not limited.

Hereinafter, an electronic device and a method implemented by the electronic device according to various embodiments will be disclosed referring to the accompanying drawings.

FIG. 1 is a block diagram illustrating a configuration of an electronic device according to various embodiments of the present invention.

Referring to FIG. 1, the electronic device 100 according to various embodiments of the present invention may include a display unit 110, input unit 120, storage unit 130, communication unit 140, speaker 150, microphone 160, and control unit 170.

The display unit 110 can display a verity of information under the control of the control unit 170. The display unit 110 may include a display panel or a hologram. The display panel may be an LCD (Liquid-Crystal Display) or an AM-OLED (Active-Matrix Organic Light-Emitting Diode). The display panel may be configured in a flexible, transparent, or wearable form. The hologram can show a 3-dimensional image in the air by using light interference. The display unit 110 may further include a control circuit to control the display panel or the hologram.

The display panel may include a touch panel 111 as an input device for the interaction between a user and the electronic device 100. If so, the display unit 110 may be called "touch screen".

The touch panel 111 may be configured with an add-on type which is installed on the screen of the display unit 110, or an on-cell or in-cell type which is inserted in the display unit 110. The Touch panel 111 may detect a user input by using at least one of an electrostatic, pressure sensitive, infrared, or ultrasonic type, generate an event corresponding to the user input and transmit the event to the control unit 170.

The touch panel 111 may detect a gesture if a conductive object (for example, a finger or a stylus) directly contacts a screen or approaches the touch panel 111 within a predetermined distance (i.e. a hovering operation). The touch panel 111 may generate an event corresponding to the gesture, and transmit the event to the control unit 170.

The input unit 120 is one different from the touch panel 111 installed in the display unit 110, and may include a touch key. The touch key can identify a touch or an approach of a human body or an object. The input unit 120 can generate an event responding to a user input, and transmit the event to the control unit 170. The input unit 120 may further include a key of another type (for example, a dome key) besides the touch key. For example, if a user presses the dome key, the dome key contacts with a printed circuit board by deforming, and thereby an event is generated on the printed circuit board and transmitted to the control unit 170.

The storage unit 130 stores data (for example, SMS, MMS, SNS message, and email) generated by the electronic device 100 under the control of the control unit 170 or received from an external device through the communication unit 140. Further, the storage unit 130 stores a booting program, at least one operating system, and applications. Further, the storage unit 130 can store a variety of setting information (for example, a screen brightness) for setting an usage environment of the electronic device 100. Accordingly, the control unit 170 can operate the electronic device 100 referring to the setting information.

The storage unit 130 may include a main memory and an auxiliary memory (secondary memory). The main memory may be configured, for example, with a RAM. The auxiliary memory may be configured with a disk, RAM, ROM or flash memory. The main memory can store various programs loaded from the auxiliary memory such as a booting program, operating system (for example, kernel), middleware, API (Application Programming Interface), and applications. If a power is supplied from a battery to the control unit 170, the booting program is firstly loaded into the main memory. Such a booting program can load an operating system into the main memory. The operating system can load an application into the main memory. The control unit 170 accesses to the main memory, interprets a command (or a routine) of the program, and performs a function according to the result of interpretation.

The storage unit 130 may further include an external memory. For example, the storage unit 130 may include a CF (Compact Flash), SD (Secure Digital), Micro-SD (Micro Secure Digital), Mini-SD (Mini Secure Digital), xD (extreme Digital), or Memory Stick as an external memory.

According to various embodiments of the present invention, the storage unit 130 can store external device information 131 and a connectivity management program 132.

The external device information 131 includes information related to an external device which enables a near-field wireless communication with the electronic device 100. The electronic device 100 can connect to the external device by using the external device information 131. For example, the electronic device 100 finds an external device on the periphery by scanning a near-field wireless communication channel, identifies a device to be connected to the electronic device 100 based on the external device information 131, and establishes a connection with the identified device by using the external device information 131.

According to various embodiments of the present invention, the external device information 131 is identified by corresponding devices and includes information for connecting to the corresponding device such as a MAC (Media Access Control) address, UUID (Universally Unique Identifier), SSID (Subsystem Identification), and IP (Internet Protocol) address, and device name. Additionally, the external device information 131 may include location information of corresponding devices such as a cafe, office, and home. The external device information 131 may be called 'profile'. Further, the external device information 131 may include authentication information such as a password to obtain authentication from a device having a security setting.

According to various embodiments of the present invention, the external device information 131 include information for communicating with corresponding devices. For example, such information may include information indicating a function executable by an external device and information indicating data provided by the external device for the electronic device 100, information indicating data format, or information indicating a data encryption type. Such information may be called 'profile'. For example, if the external device is one supporting a BLE (Bluetooth Low Energy), the external device information 131 may include a GATT (Generic Attribute) profile. By identifying the GATT profile, the electronic device 100 can identify a function and data provided by a BLE device, control the BLE device, or perform a data communication with the BLE device. If the external device is one supporting a Wi-Fi direct, the external device information 131 may include a "Wi-Fi P2P configuration" profile. The external device information 131 may include group information indicating to which group the corresponding device belongs.

According to various embodiments of the present invention, the connectivity management program 132 may be configured so that the control unit 170 can perform a function for simultaneously connecting to a plurality of external devices. Here, "simultaneous connection" may be defined to include an operation of simultaneously transmitting request messages for the connection with the plurality of external devices. For example, the simultaneous transmission operation may have a different concept from an operation of sequentially transmitting request messages to the plurality of external devices.

The connectivity management program 132 may be a portion of the operating system or an independent application. An icon (for example, a button, object, or item) indicating the connectivity management program 132 may be displayed in a screen (for example, a lock screen, home screen, environment setting menu) as a component configuring the screen. If such an icon is selected by a user, the electronic device 100 can operate with the connectivity management program 132.

The connectivity management program 132 may be configured so that the control unit 170 can perform a function to control external devices connected to the electronic device 100 and to communicate with the external devices.

The communication unit 140 can perform a voice communication, video communication, or data communication with the external device 20 through a network (for example, mobile communication network such as an LTE and a wireless LAN) under the control of the control unit 170. The communication unit 140 can directly communicate with the external device 10 through a predetermined frequency channel without a network relay (for example, without an AP (Access Point)).

The control unit 170 can control general operations of the electronic device 100, signal flows between internal components of the electronic device 100, data processing, and a power supply from a battery to the components.

According to various embodiments of the present invention, the control unit 170 may include a processor 171. The processor 171 may include an AP (Application Processor), CP (Communication Processor), GPU (Graphic Processing Unit), and audio processor. Here, the CP may be a component of the communication unit 140.

The processor 171 (for example, AP) can process a command or data received from at least one of a non-volatile memory (for example, a memory uses as an auxiliary memory) or other components by loading into a volatile memory (for example, a memory used as a main memory). Further, the processor 171 can store data received from at least one component or generated by at least one component in the non-volatile memory.

The processor 171 (for example, an AP) may include a connectivity management module 171a which connects and controls a plurality of external devices by using the connectivity management program 132. Hereafter, a method for connecting and controlling according to various embodiments of the present invention will be describe in more detail.

In the meantime, electronic device 100 may further include components not listed above such as an earphone jack, proximity sensor, illumination sensor, SIM (Subscriber Identification Module) card, and camera. Further, the electronic device 100 may include an interface unit for a wired connection with external devices. Such an interface unit may be connected to the external device through a wire such as a USB cable. Accordingly, the control unit 170 can perform a data communication with the external device through the interface unit.

Figure 2:
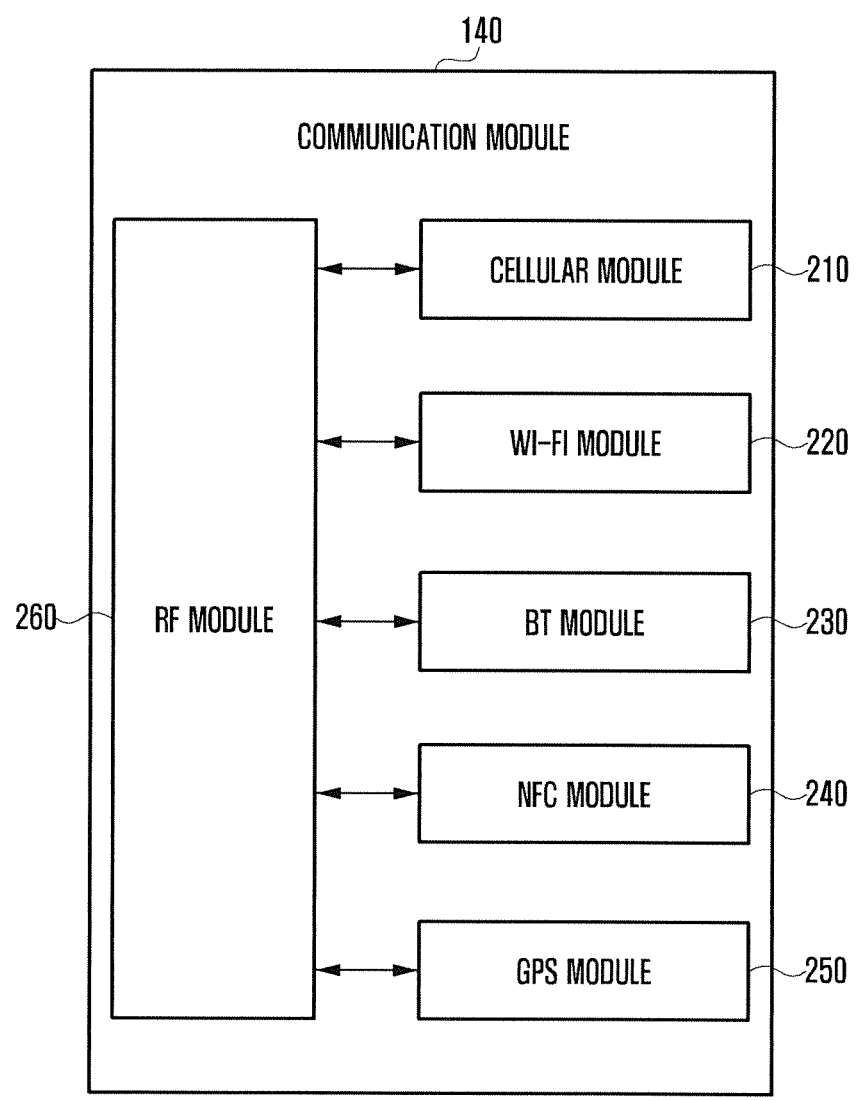
FIG. 2 is a block diagram illustrating a configuration of a communication unit according to various embodiments of the present invention.

FIG. 2 is a block diagram illustrating a configuration of a communication unit according to various embodiments of the present invention.

Referring to FIG. 2, the communication unit 140 may include a cellular module 210, Wi-Fi module 220, BT module 230, NFC module 240, GPS module 250, and RF (Radio Frequency) module 260.

The cellular module 210 can provide a voice communication, video telephony, character service, or internet service through a network such as an LTE, LTE-A, CDMA, WCDMA, UMTS, WiBro, or GSM. For example, the cellular module 210 can perform authentication of the electronic device by using a subscriber identification module such as a SIM card. The cellular module 210 can perform a partial function (for example, at least a portion of a multimedia control function) which is provided by the processor 171 (for example, an AP).

The cellular module 210 may include a CP. The cellular module 210 may be configured with a SoC. Although components such as a cellular module 210 (for example, communication processor) and a storage unit 130 are shown separately from the processor 171 (for example, AP), according to another embodiment, the AP can include at least a portion of the above components (for example, a cellular module 210).

The cellular module 210 (for example, CP) can process a command or data received from a non-volatile memory or other components by loading into a volatile memory. Further, the cellular module 210 can store data received or generated from other components in the non-volatile memory.

Each of Wi-Fi module 220, BT module 230, NFC module 240, or GPS module 250 may include a processor for processing data received or transmitted through a corresponding module. Although the cellular module 210, Wi-Fi module 220, BT module 230, NFC module 240, and GPS module 250 are separately illustrated in FIG. 2, according to another embodiment, at least one of the cellular module 210, Wi-Fi module 220, BT module 230, NFC module 240, and GPS module 250 may be included in an IC (integrated chip) or an IC package. For example, at least one of processors corresponding to the cellular module 210, Wi-Fi module 220, BT module 230, NFC module 240, and GPS module 250 (for example, a communication processor corresponding to the cellular module 210 and a Wi-Fi processor corresponding to the Wi-Fi module 220) may be configured with a SoC.

The RF module 260 can transmit or receive data such as an RF signal. Although not shown in the drawings, the RF module 260 may include a transceiver, PAM (Power Amp Module), frequency filter, or LNA (Low Noise Amplifier).

The RF module 260 may further include components required for transmission and reception of electromagnetic waves in a free space of wireless communication such as a conductive material or a conducting wire. Although the cellular module 210, Wi-Fi module 220, BT module 230, NFC module 240, and GPS module 250 are shown to share an RF module 260 in FIG. 2, according to another embodiment, at least one of the cellular module 210, Wi-Fi module 220, BT module 230, NFC module 240, and GPS module 250 may transmit or receive an RF signal through a separate RF module.

Figure 3:
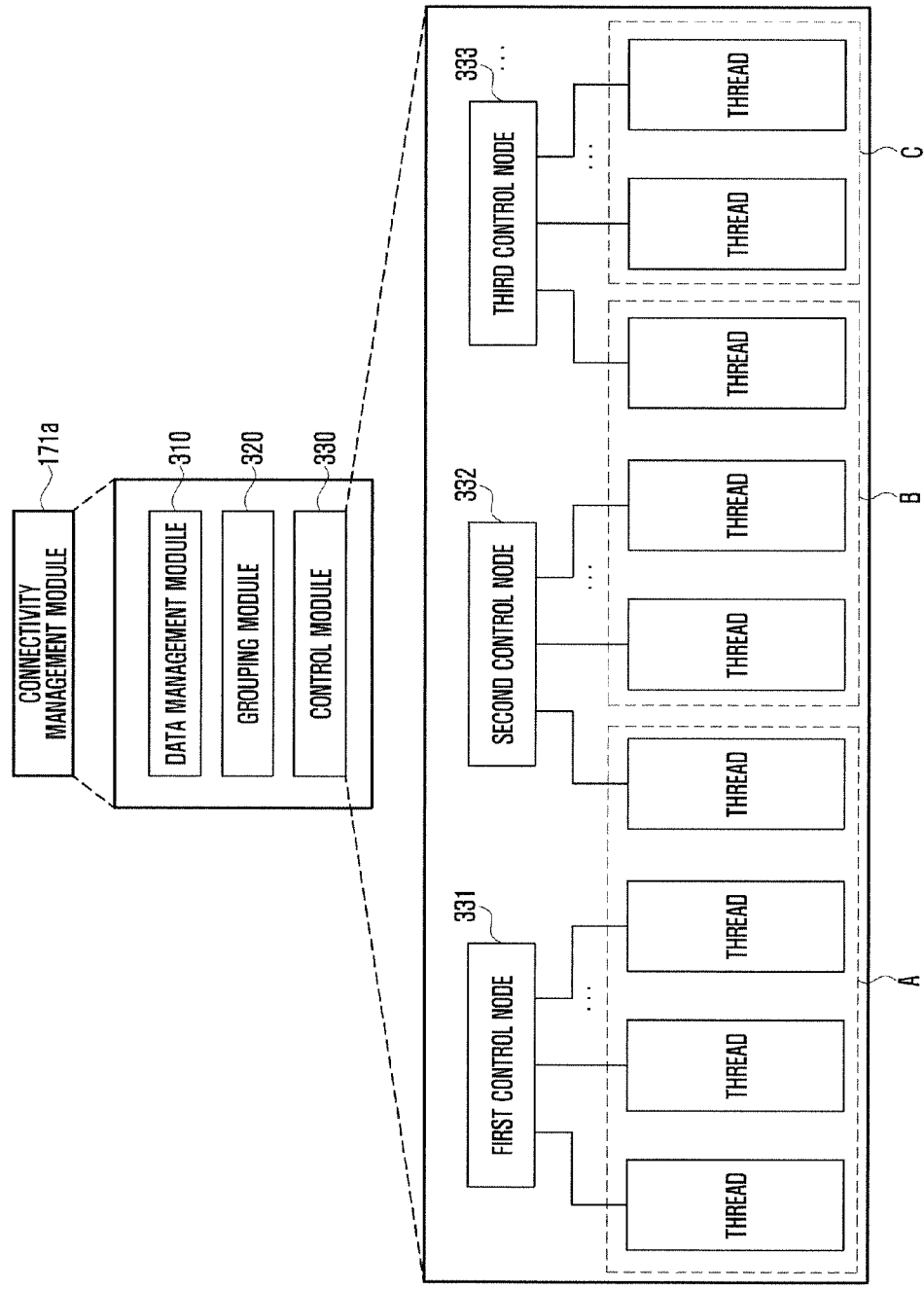
FIG. 3 is a block diagram illustrating a configuration of a connectivity management module according to various embodiments of the present invention.

FIG. 3 is a block diagram illustrating a configuration of a connectivity management module according to various embodiments of the present invention.

Referring to FIG. 3, the connectivity management module 171a may include a data management module 310, grouping module 320, and control module 330.

The data management module 310 manages external device information 131. In particular, the data management module 310 can receive data from an external device (for example, the external device 10 or the external device 20) through the communication unit 140, and manage (for example, generate, add, delete, or update) the external device information 131 by using the received data. The data management module 310 can transmit at least a portion of the external device information 131 to an external device through the communication unit 140. For example, the data management module 310 can share the external device information 131 with a specific external device.

The grouping module 320 classifies known external devices (i.e., electronic devices registered in the external device information 131) into a plurality of groups according to a setting criterion, and stores group information in the storage unit 130. For example, as shown in FIG. 3, a group A may include threads in charge of a first control node 331 and a portion of threads in charge of a second control node 332. A group B may include another portion of threads in charge of the second control node 332 and a portion of threads in charge of a third control node 333. A group C may include another portion of threads in charge of the third control node 333. The group information is a data file which can be included in the external device information 131. In the meantime, the setting criterion may be set by a user input.

The setting criterion may be a near-field wireless communication type of an external device. Namely, the grouping module 320 can classify the external devices into a plurality of groups (for example, a Wi-Fi, BT, and NFC) according to the near-field wireless communication type.

The setting criterion may be information received from and related to an external device. For example, the grouping module 320 can classify the external devices in a plurality of groups (for example, home appliances, audio equipment, and office equipment) based on the device names.

The setting criterion may be location information received from an external device or obtained by the electronic device 100. For example, the grouping module 320 can classify the external devices into a plurality of groups based on the location information. The location information may include at least one of altitude and latitude information, geometrical address information (for example, 416 Metan-4-dong, Youngtong-gu, Suwon-city, Korea), or information related to a geometrical address. Here, the information related to a geometrical address may include a least one of building information related to the geometrical address (for example, names of a building, cafe, city hall, and department store), structure information (for example, names of a tunnel, mountain, and cell ID of a base station), IP address corresponding to the geometrical address, or a telephone number corresponding to the geometrical address. Besides these, a variety of information related to the geometrical address can be include in the location information. According to further another embodiment, a variety of information not related to the geometric address information (for example, a speed and an automobile identification related to transportation means, and road guide application being executed) may be included in the location information. According to further another embodiment, the location information may be relative location information received through a communication device (for example, a Wi-Fi and a BT) or a video device.

According to an embodiment of the present invention, if external device information is obtained, the grouping module 320 requests a location obtaining module (not shown) for information. The location obtaining module receives GPS signals from GPS satellites through the GPS module 250, and calculates a location of the electronic device 100 by using the GPS signals. Here, the operation of calculating may include an operation of controlling the communication unit 140 to transmit the calculated altitude and latitude information to a map providing sever, an operation of controlling the communication unit 140 to receive map information, from the server, related to the altitude and latitude information, and operation of generating location information of the electronic device 100 based on the map information. According to further another embodiment, the location obtaining module can receive relative location information through a communication device (for example, a Wi-Fi and a BT), or a video device, and calculate a location. The location obtaining module transmits the location information to the grouping module 320. The grouping module 320 makes groups for the corresponding external devices related to the received location information. For example, if a user is located at "cafe A", external devices found at the corresponding cafe can be classified as a group 'cafe A'.

The connectivity management module 171a can command a connection to the control module 330. Information of a connectable external device and group information may be included in the command. According to the command, the control module 330 can control connection and communication between external devices. In particular, the control module 330 can control the connection and communication by groups. The control module 330 may include nodes (for example, a first control node 331, second control node 332, and third control node 333) which control the connection and communication with corresponding groups.

Each control node generates a thread (i.e., a code, command, instruction, or routine) for the connection and communication with external devices. The thread may be generated based on the external device information 131. Further, the thread may include various objects (for example, identification information of a corresponding external device, profile, callback information for a data read/write and a command, frequency channel information, and authentication information) required for the connection with a corresponding external device. The thread is processed by the processor 171 (for example, AP). In particular, the processor 171 can process the threads simultaneously.

Figure 4:
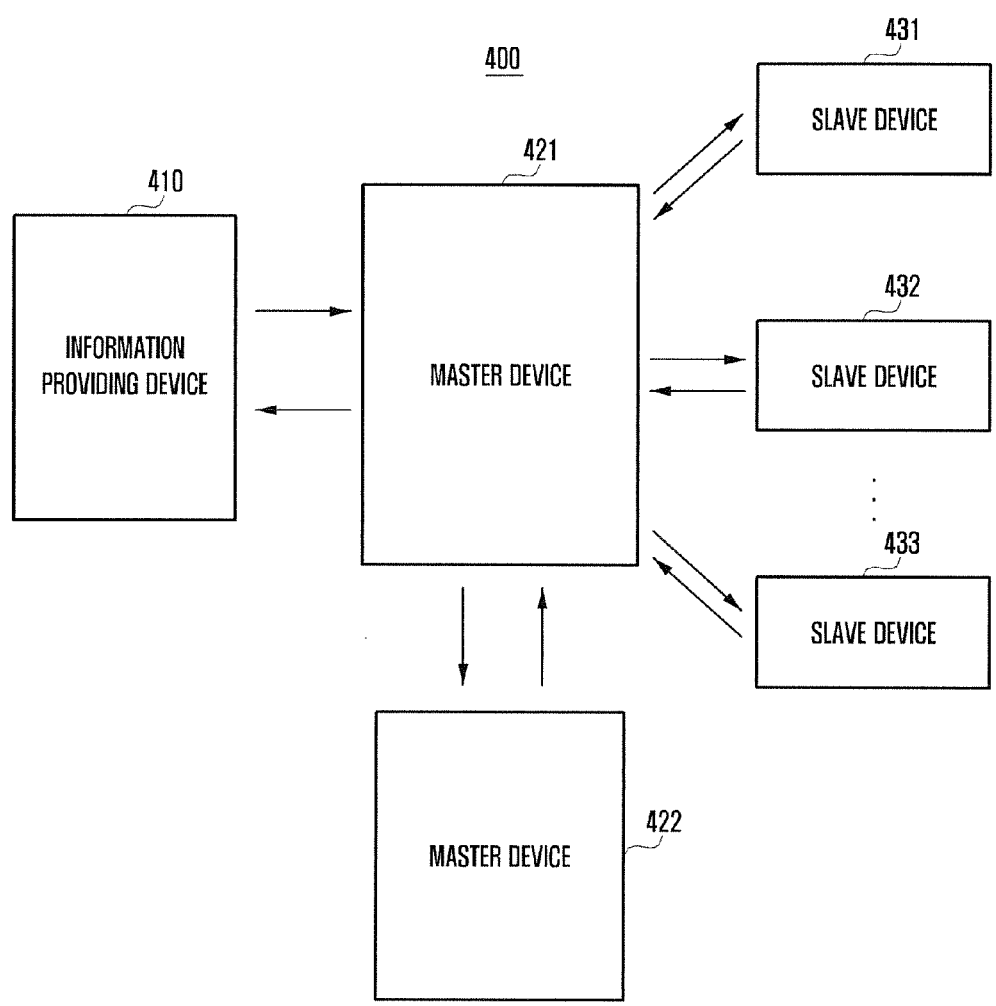
FIG. 4 is a block diagram illustrating a connectivity management system according to various embodiments of the present invention.

FIG. 4 is a block diagram illustrating a connectivity management system according to various embodiments of the present invention.

Referring to FIG. 4, a system 400 may include an information providing device 410, master devices 421 and 422, and slave devices 431 to 433. Here, the term 'information providing' indicates a function of a corresponding electronic device in the system 400 (i.e., providing information to a master device), and doesn't limit the function of the corresponding device. Various functions can be performed by the corresponding device. The terms 'master' and 'slave' indicate a relationship in a function control (i.e., a master device controls a slave device connected to itself), and doesn't limit the function of the corresponding device. Connections between devices in the system 400 may be established through a network or directly without a network relay.

The information providing device 410 transmits slave device information (for example, external device information 131) to the master device 421 in response to a request of the master device 421.

The information providing device 410 may be a tag (for example, an NFC tag or an RFID tag) installed at a specific place (for example, cafe, home, office, automobile, and public transportation means). The information providing device 410 may be user equipment such as a smartphone and a tablet PC. The information providing device 410 may be a server (for example, a cloud server and a web server) which provides the user equipment with various services.

According to various embodiments of the present invention, the slave device information may be recorded in a barcode or a QR (Quick Response) code, and, if the slave device information is recorded in a code, the code can be further added to the system 400. Instead of adding the code, the information providing device 410 may be omitted from the system 400. The master device 421 may include a camera (optical reader) and a program for reading a code.

The master device 421 (for example, electronic device 100) stores the slave device information by receiving from the information providing device 410. The master device 421 can read a code, obtain slave device information by processing the code, and store the obtained information.

The master device 421 can share the stored information with another master device 422. The master device 421 may receive slave device information from another master device 422 and store the received information. In this case, the information providing device 410 may be omitted from the system 400.

The master device 421 can simultaneously connect to at least one slave device 431 to 433 by using the stored information. The master device 421 can control the connected slave devices 431 to 433, and exchange data with the connected slave devices 431 to 433.

The slave devices 431 to 433 may be a portable electronic device or a wearable electronic device (for example, a hearing-aid). Further, the slave devices 431 to 433 may be devices installed in a specific spot such as office equipments, home appliances, or medical equipment and so on.

According to various embodiments of the present invention, the electronic device may include a communication unit configured to perform a near-field wireless communication with external devices directly or through a network; a storage unit configured to store external device information for a connection with the external devices; and a processor configured to control the communication unit ad the storage unit. The processor can obtain the external device information from the storage unit or from an information providing device through the communication unit, control the communication unit to connect to the external devices by using the obtained external device information, and control the connected external devices through the communication unit.

The processor can generate threads by using the external device information and perform a simultaneous connection with the external devices.

The processor may include a grouping module configured to classify the external devices into a plurality of groups according to a predetermined criterion and a control module configured to generate control nodes in charge of each group. The control node finds an external device belonging to a group in charge of itself by performing a scanning operation, and generates a thread of the found external device. The criterion may be a near-field wireless communication type of the communication unit. The near-field wireless communication type may include at least one of Bluetooth, Wi-Fi, and NFC (Near-field Communication).

The electronic device may further include an input device configured to generate a user input and a display unit configured to display a list of the external devices. The processor may include a grouping module configured to classify the external devices into a plurality of groups responding to the user input and to generate and store identification information by groups, and a control module configured to generate a thread corresponding to a group selected by a user from the identification information.

The processor may include a grouping module configured to classify the external devices based on at least a portion of the external device information and to generate and store identification information by groups, and a control module configured to generate a thread corresponding to a group selected by a user from the identification information. The external device information may include at least one of external device type information and location information. The grouping module can perform the classification further based on the location information of the electronic device.

The electronic device may further include a GPS module for receiving altitude and latitude information from GPS satellites, and the location information may be calculated based on the received altitude and latitude information.

Figure 5:
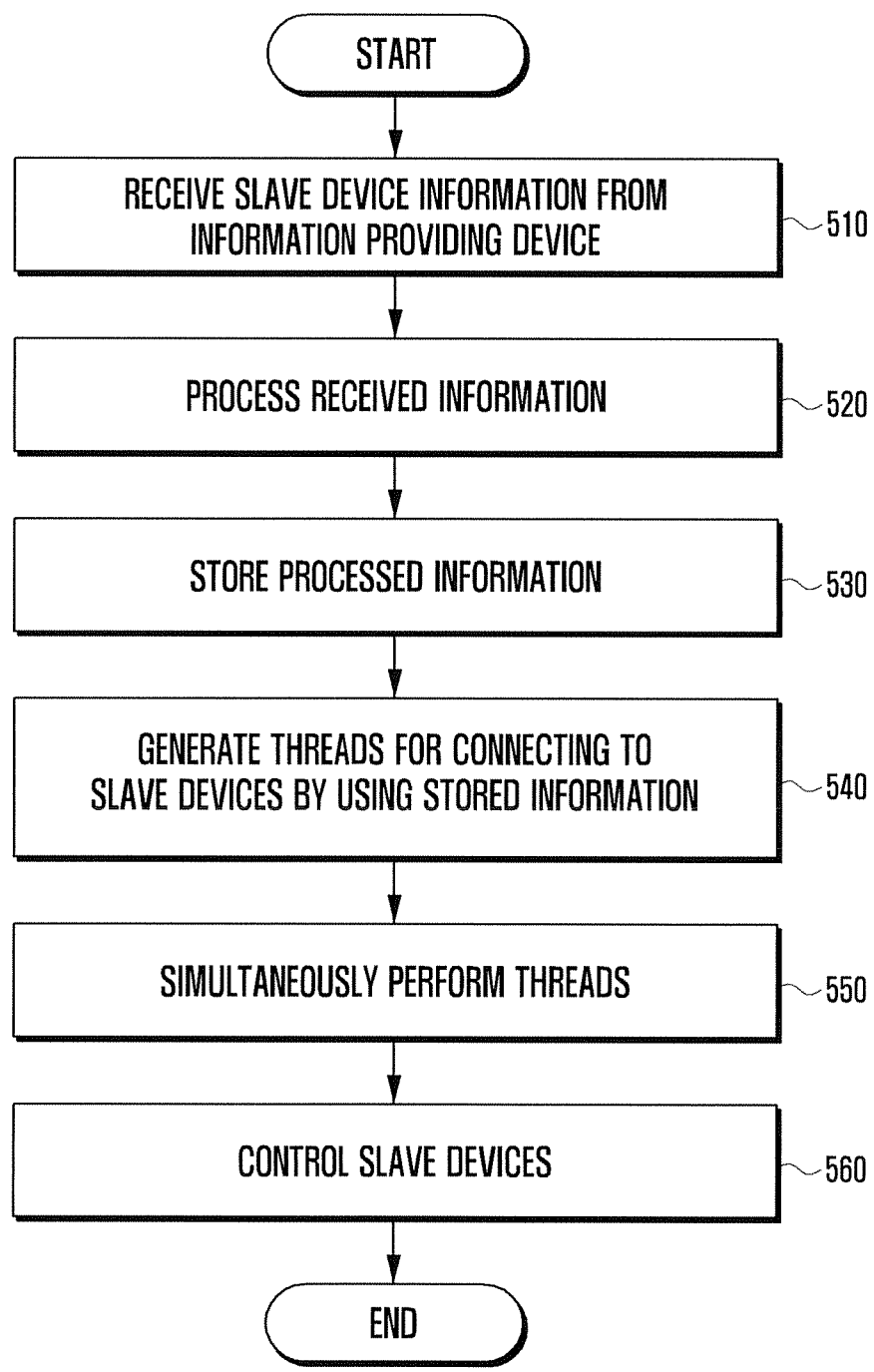
FIG. 5 is a flowchart illustrating a method for connecting to a plurality of external devices according to an embodiment of the present invention.

FIG. 5 is a flowchart illustrating a method for connecting to a plurality of external devices according to an embodiment of the present invention. The electronic device 100 operates as a master device which performs the operations of FIG. 5.

Referring to FIG. 5, the control unit 170 of the electronic device 100 (for example, processor 171) may receive slave device information from the information providing device through the communication unit 140 at operation 510. According to another embodiment, the processor 171 may receive the slave device information from a barcode or a QR code through a camera or an optical reader.

The processor 171 may process the received information at operation 520. The operation of processing may include decoding the received information by the data management module 310. Further, the operation of processing may include an operation of extracting data (for example, identification information for configuring external device information 131, connection information, and location information) required by the data management module 310. Further, the operation of processing may include an operation of generating group information by the grouping module 320.

The processor 171 may store the processed information in the storage unit 130 as external device information 131 at operation 530.

The processor 171 may generate threads for connecting with slave devices by using the processed information at operation 540. The operation 540 and the operation 530 can be processed at the same time. Additionally, the processor 171 can classify the slave devices into a plurality of groups according to a predetermined criterion (for example, near-field wireless communication type). The processor 171 can generate a control node in charge of each classified group. The control nodes may perform a scanning operation. For example, the processor 171 may perform a scanning operation of the control nodes (for example, multiprocessing) by synchronizing with a near-field wireless communication module (for example, a Wi-Fi module 220 and a BT module 230). As a result of the scanning operation, the near-field wireless communication module can receive external devices information. The external device information is transmitted to the processor 171, and, based on the information transmitted to the processor 171, the control nodes can find slave devices belonging to groups in charge of themselves. The processor 171 can generate threads for a simultaneous connection with the slave devices found by each control node by using the external device information 131. For example, a first control node 331 may be in charge of generating a thread for a BT type. A second control node 332 may be in charge of generating a thread for a Wi-Fi type. A third control node 332 may be in charge of generating a thread for another near-field wireless communication type (for example, an NFC type).

According to another embodiment, if the predetermined criterion setting is group information (for example, group information by locations), the first control node 331 may be in charge of generating a thread for a slave device located at a first location (for example, home). The second control node 332 may be in charge of generating a thread for a slave device located at a second location (for example, office). The third control node 333 may be in charge of generating a thread for a slave device located at a third location (for example, cafe).

The processor 171 may simultaneously perform the generated threads by synchronizing with the near-field wireless communication modules at operation 550. For example, the near-field wireless communication modules can exchange information for connecting with the slave devices according to a command of the processor 171.

If the threads for salve device are successfully generated, connections with the slave device can be established. If the processor 171 is connected to the slave devices, an interface for informing a user that a connection is established through the display unit 110 or a separate output device (for example: SPK 150) and/or an interface for a control operation following the connection can be provided.

Subsequently, the processor 171 may control the connected slave devices through the near-field wireless communication module(s) at operation 560. For example, the processor 171 can transmit a command for executing a predetermined function to the connected slave devices through the near-field wireless communication modules in response to a user input. Responding to the command, the slave devices can execute a corresponding function (for example, a hearing-aid function). The user input may be received through the touch panel 111 or the input unit 120. Further, the user input may be received from another electronic device through the communication unit 140. For example, the electronic device 100 may be a smartphone and another electronic device may be a smart watch. Further, the processor 171 can receive a voice signal from the microphone 160, and identify the voice signal as a user input for controlling the slave device.

According to an embodiment of the present invention, the processor 171 can obtain external device information (for example, information for connecting to external devices) in response to the user input. For example, the processor 171 can receive the information from an information providing device (for example, an NFC tag) or from the storage unit 130. Subsequently, the processor 171 may perform a connection procedure with the external devices, and transmit a command for executing a predetermined function (for example, a hearing-aid function) to the connected external devices through the near-field wireless communication modules. Responding to the command, the external devices can execute a corresponding function. According to this embodiment, a user may control another electronic device (for example, a hearing-aid) with a user input by using the electronic device (for example, smartphone).

Figure 6:
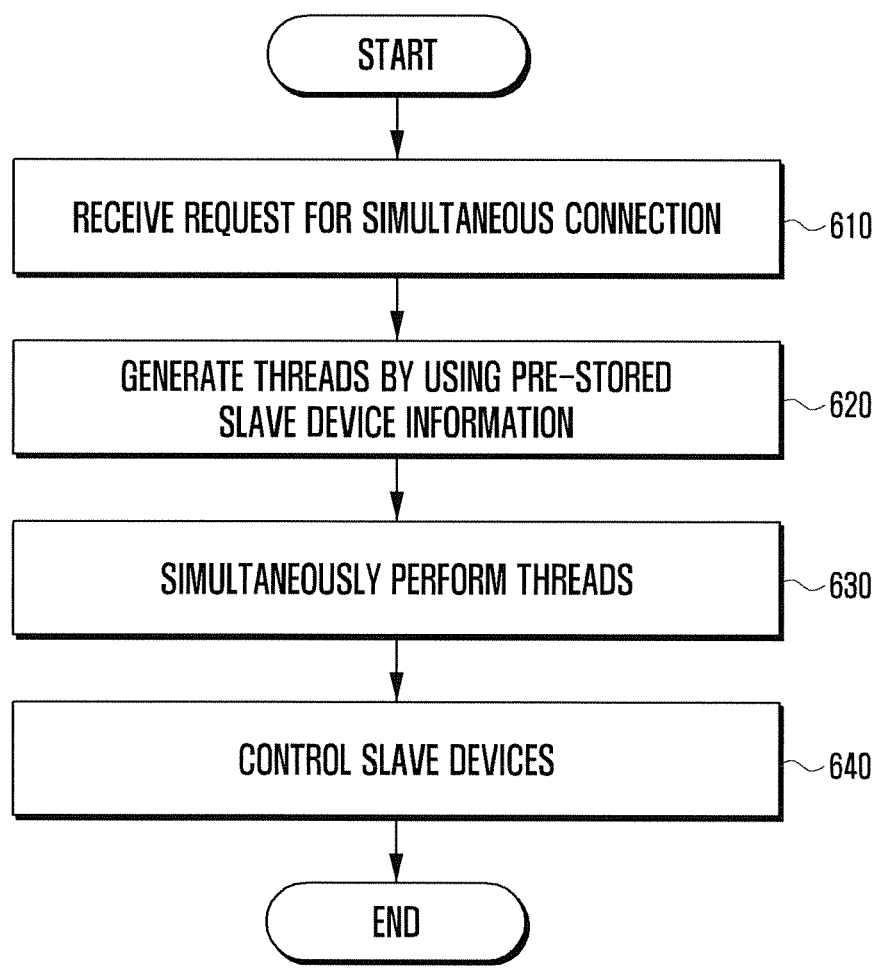
FIG. 6 is a flowchart illustrating a method of connecting to a plurality of external devices according to another embodiment of the present invention.

FIG. 6 is a flowchart illustrating a method of connecting to a plurality of external devices according to another embodiment of the present invention. The electronic device 100 is a master device which performs operations of FIG. 6.

Referring to FIG. 6, the processor 171 may receive a user input requesting for a simultaneous connection from the touch panel 111 or the input unit 120 at operation 610. Further, the processor 171 can receive a user input from another electronic device connected to the electronic device 100 through the communication unit 140. Further, the processor 171 can receive a voice signal from the microphone 160, and identify the voice signal as a request for a simultaneous connection.

The processor 171 may obtain the external device information 131 by accessing to the storage unit 130 in response to the user input, and generate threads by using the external device information 131 at operation 620. Such an operation of generating threads may be same as the operation 540.

The processor 171 may simultaneously perform the generated threads by synchronizing with the near-field wireless communication modules at operation 630. The processor 171 may control the connected slave devices through the near-field wireless communication modules in response to the user input at operation 640.

Figure 7:
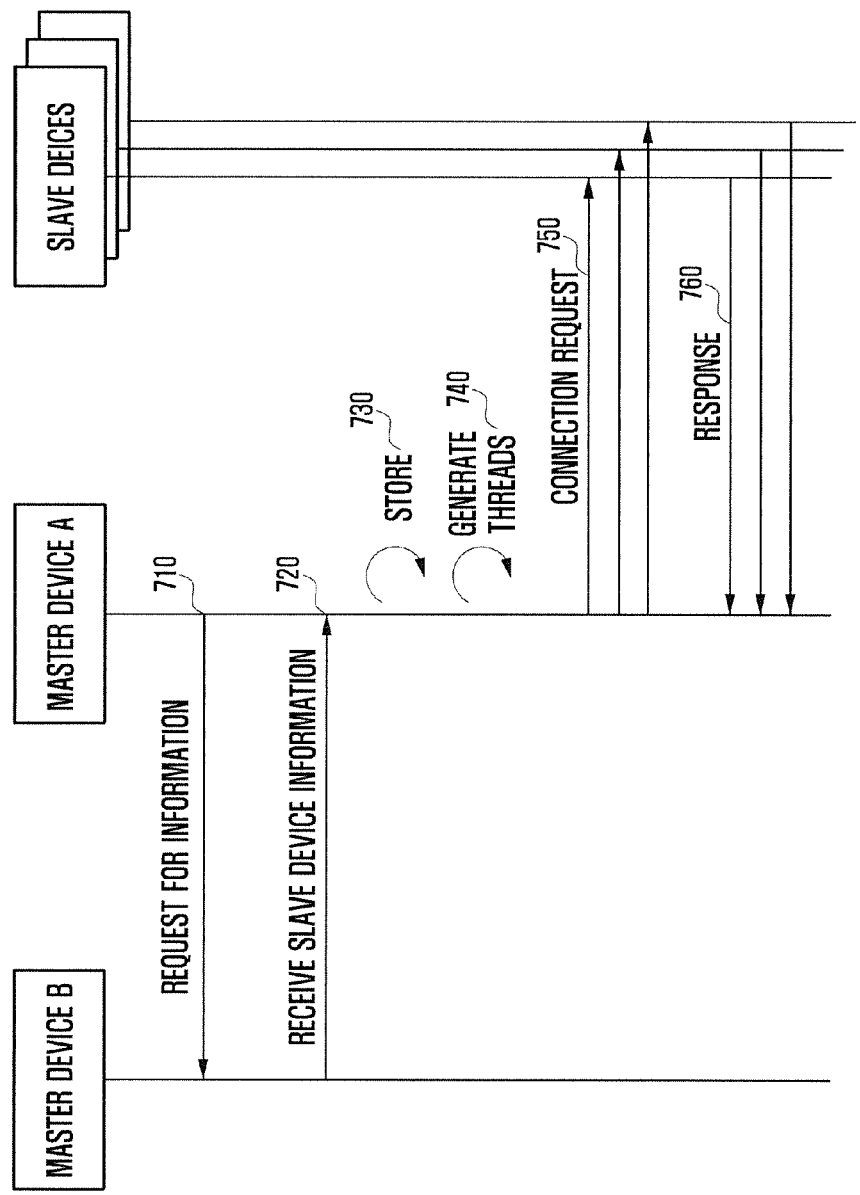
FIG. 7 is a flowchart illustrating a method for connecting to a plurality of external devices according to further another embodiment of the present invention.

FIG. 7 is a flowchart illustrating a method for connecting to a plurality of external devices according to further another embodiment of the present invention.

Referring to FIG. 7, the master device A (for example, electronic device 100) may request another master device B for slave device information at operation 710. The connection between master devices can be established through a network or directly without a network relay.

The master device A may receive slave device information from the master device B at operation 720.

The master device A may store the received information in its own memory at operation 730.

The master device A may generate threads by using the stored information at operation 740.

The master device A may simultaneously transmit request messages to the slave devices according to the processing of the threads at operation 750.

The master device A may establish connections with the slave devices by receiving response messages from the slave devices at operation 760.

Figure 8:
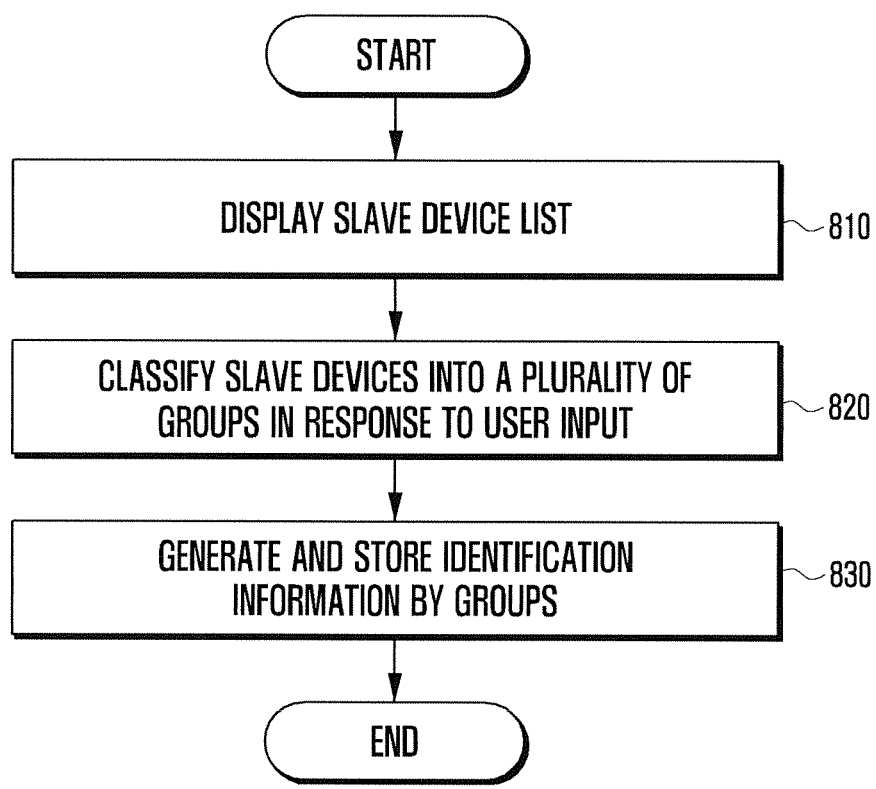
FIG. 8 is a flowchart illustrating a method of grouping according to an embodiment of the present invention.

FIG. 8 is a flowchart illustrating a method of grouping according to an embodiment of the present invention. FIGS. 9A and 9B are screen examples respectively illustrating a slave device list and a group setting.

Referring to FIGS. 8, 9A, and 9B, the control unit 170 may control the display unit 110 to display a slave device list 910 as shown in FIG. 9A at operation 810.

The control unit 170 may classify the slave devices into a plurality of groups in response to a user input at operation 820. For example, referring to FIG. 9A, the display unit 110 can display a mark in a check box of a corresponding item if a user selects devices 1, 3, and 6. If the user selects a group button 920, the control unit 170 can set the device 1, 3, and 6 of the checked items as one group.

The control unit 170 may generate and store identification information (for example, a group name) by each classified group at operation 830. Referring to FIGS. 9B and 9C, the display unit 110 can display an input window 930 for setting a group name if the user selects the group button 920. If a store button 940 is selected in the state of inputting a group name in the input windows 930, the control unit 170 can store the input group name corresponding to the devices 1, 3, and 6.

Figure 10:
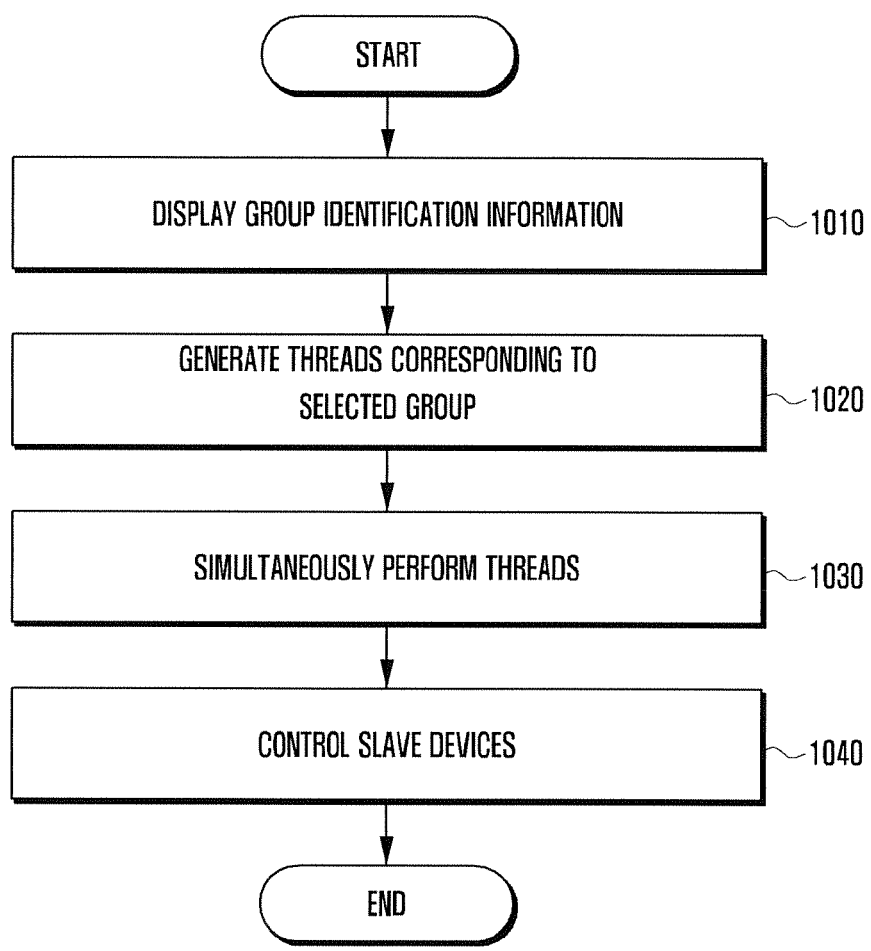
FIG. 10 is a flowchart illustrating a method for connecting to a plurality of external devices according to further another embodiment of the present invention.
Figure 11:
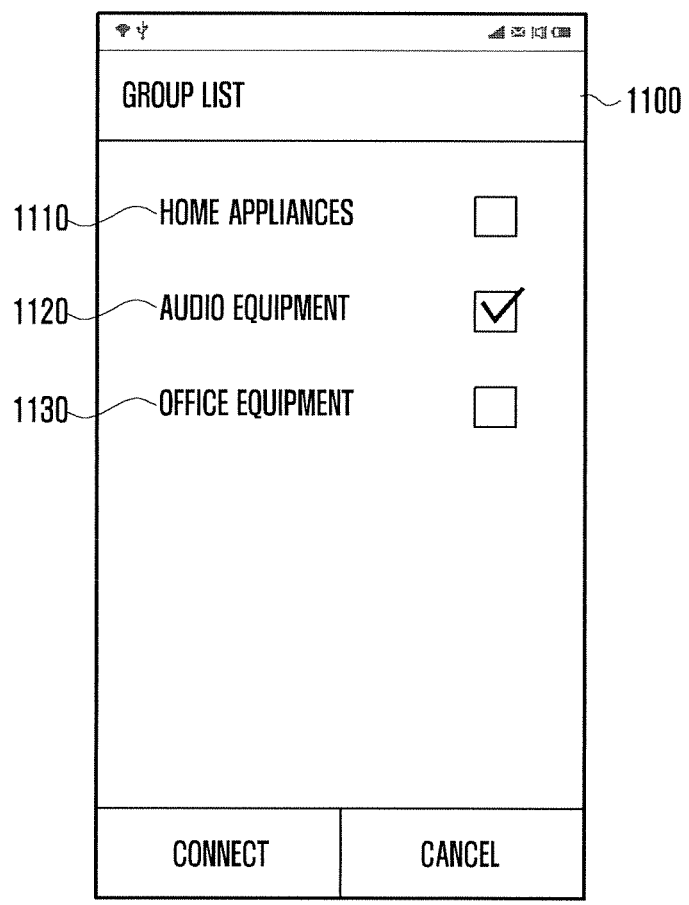
FIGS. 11 and 12 are screen examples illustrating a group list according to an embodiment of the present invention.
Figure 12:
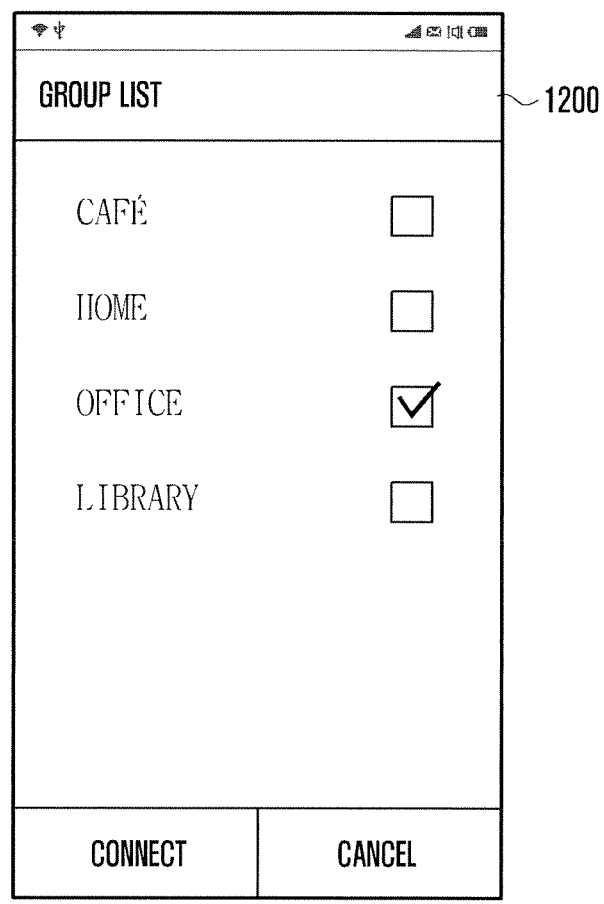

FIG. 10 is a flowchart illustrating a method for connecting to a plurality of external devices according to further another embodiment of the present invention. FIGS. 11 and 12 are screen examples illustrating a group list according to an embodiment of the present invention.

Referring to FIGS. 10 to 12, the control unit 170 may control the display unit 110 to display a variety of group identification information at operation 1010. Referring to FIG. 11, the display unit 110 can display a group list screen 1100 showing groups by slave device types. The group list screen 1100 may include an item 1110 indicating home appliances, item 1120 indicating audio equipment, and item 1130 indicating office equipment. The criterion of grouping by types may be set by a user input as shown in FIG. 8. Further, the criterion of grouping by types may be set by slave device type information (for example, a device name) included in the external device information 131. Referring to FIG. 12, the display unit 110 can display a group list screen 1200 showing groups by locations of slave devices. For example, the group list screen 1200 may include items indicating specific locations such as a cafe, home, office, and library. The criterion of grouping by locations can be set by a user input as shown in FIG. 8. Further, the criterion of grouping by locations may be set according to location information of slave devices included in the external device information 131. Further, the criterion of grouping by locations may be set according to location information obtained by the electronic device 100.

The control unit 170 may receive a user selection for at least one group through the input unit 120 or the touch panel 111, and generate threads for slave devices corresponding to the selected group at operation 1020. Such an operation of generating threads may be same as the operation 540.

The control unit 170 may simultaneously perform the generated threads by synchronizing with the near-field wireless communication modules operation 1030. The control unit 170 controls the connected slave devices through the near-field wireless communication module in response to the user input at operation 1040.

Figure 13:
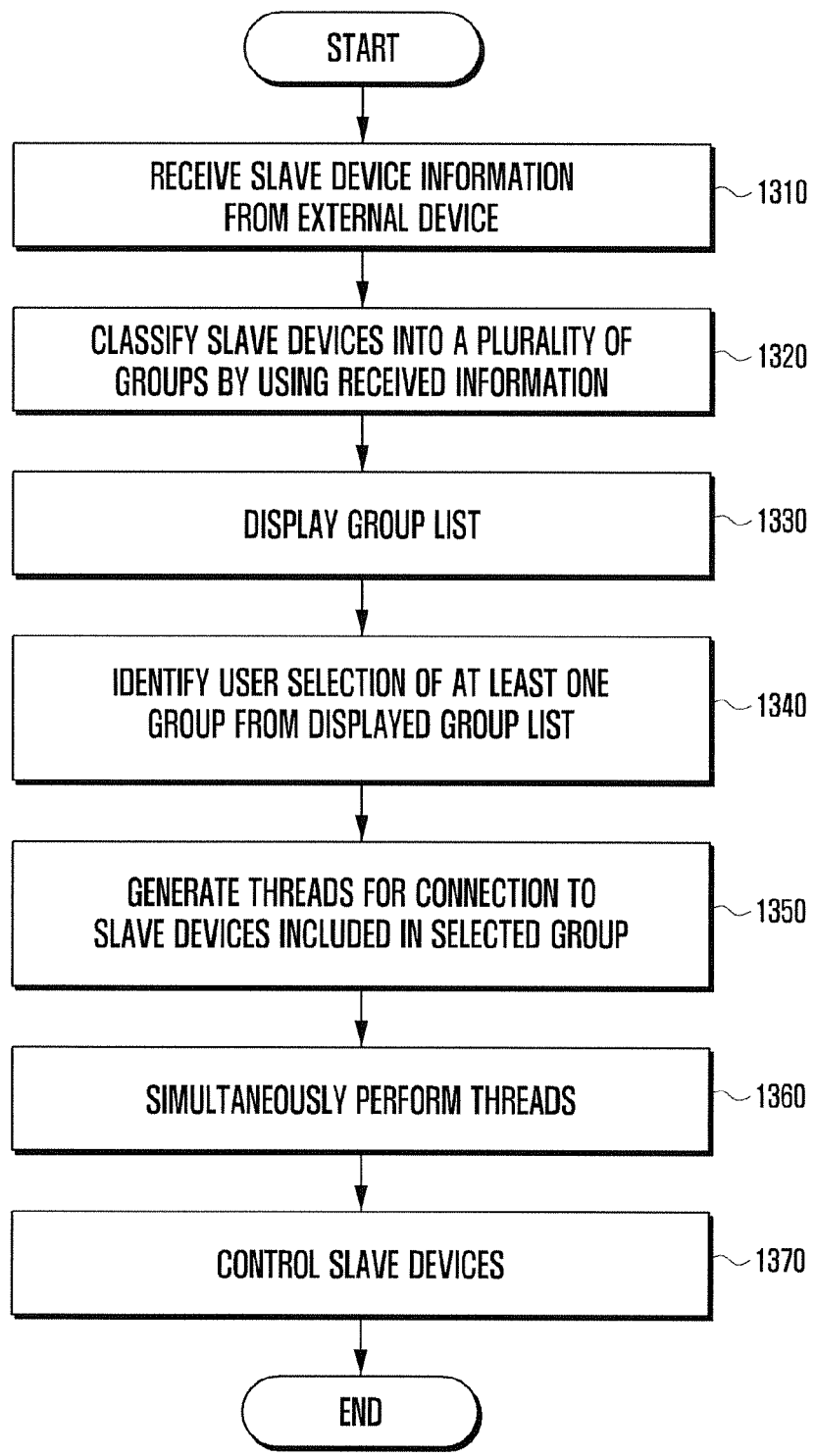
FIG. 13 is a flowchart illustrating a method for connecting to a plurality of external devices according to further another embodiment of the present invention.

FIG. 13 is a flowchart illustrating a method for connecting to a plurality of external devices according to further another embodiment of the present invention.

Referring to FIG. 13, the control unit 170 of the electronic device 100 may operate as a control unit of a master device, and receive slave device information from an external device through the communication unit 140 at operation 1310.

The control unit 170 may classify the slave devices into a plurality of groups by using the received information (for example, types of slave devices) at operation 1320.

The control unit 170 may control the display unit 110 to display a group list showing the classified groups at operation 1330.

The control unit 170 may identify a user selection of at least one group selected from the displayed group list (for example, by receiving a user input through the touch panel 111) at operation 1340.

The control unit 170 may generate threads for a simultaneous connection with slave devices belonging to the selected group at operation 1350.

The control unit 170 may simultaneously perform the generated threads by synchronizing with the near-field wireless communication modules at operation 1360. The control unit 170 may control the connected slave devices through the near-field wireless communication module(s) in response to the user input at operation 1370.

According to various embodiments of the present invention, the following scenarios may be available.

According to a scenario, various embodiments of the present invention may be applied to accommodations such as a hotel and a resort. The accommodations may provide information of an electronic device and IoT (Internet of Things) equipment installed in a room (for example, an RFID tag, NFC tag, barcode, or QR code attached in the room). A guest of the room can identify that the equipment in the room can be remotely controlled by a smartphone, if a specific application is installed in the smartphone through room guide information. The smartphone can download a corresponding application and install in a memory of the smartphone according to a user input. If the guest requests for execution of the installed application, the smartphone receives information of equipment (for example, an RFID tag) in the quest room, and can automatically connect to the equipment in the guest room by using the received information.

According to another scenario, smart schools are becoming popular and students can be educated by using a mobile electronic device such as a tablet PC or a smartphone. However, the students may use the electronic device for another purpose (particularly, an internet function) in a school hour, and thereby educational concentration may be decreased. Various embodiments of the present invention can be applied to an educational field to improve the educational concentration. For example, a student's terminal is set to be connected to a network only through a teacher's terminal. If the students attend a class, the students can activate a connection function (for example, a BT) of their own terminals. A specific electronic device installed in a classroom can collect information of students' devices by using a near-field wireless communication protocol, and store the collected information in a data form. The teacher's terminal set with a proxy to allow a limited connection receives data from an electronic device installed in the classroom. Accordingly, the teacher's terminal can limit network connections of students' terminals included in the data. Namely, the teacher's terminal allows only the network connection for an educational purpose, and doesn't response to any request of students' terminals for a network connection other than the educational purpose.

According to further another scenario, various embodiments of the present invention may be applied to a connection and control of a hearing-aid. Hereafter, the connection and control of a hearing-aid is described referring to FIGS. 14A to 14D.

FIGS. 14A to 14D are screen examples illustrating a connection and control of a hearing-aid according to an embodiment of the present invention.

Figure 14A:
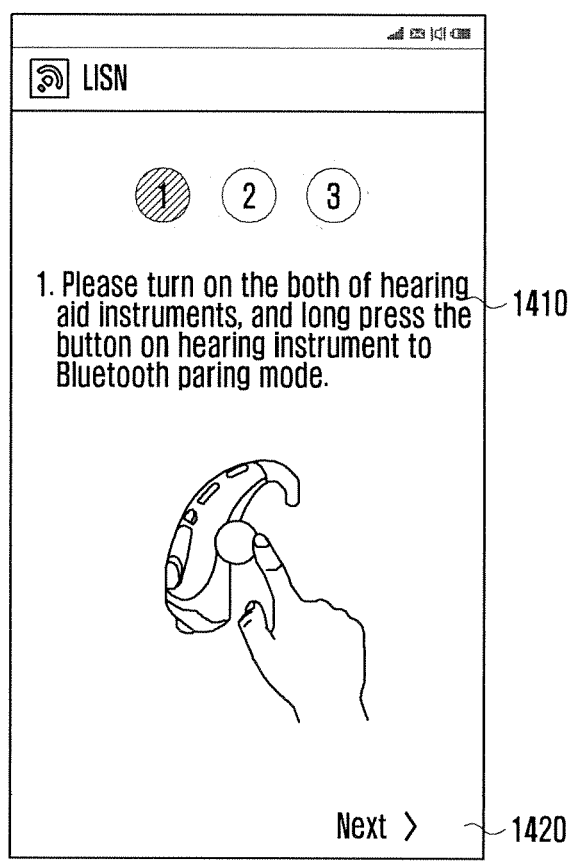
FIGS. 14A to 14D are screen examples illustrating connection and control of a hearing-aid according to an embodiment of the present invention.

Referring to FIG. 14A, the electronic device 100 operates as a master device and can display a guide message 1410 for connections with hearing-aids which correspond to slave devices. The users may identify the guide message 1410, switch on a power for the hearing-aids, and perform a long press of buttons installed in the hearing-aids. If so, the hearing-aids may operate in a Bluetooth pairing mode. Namely, the hearing-aids can activate their Bluetooth modules. Subsequently, the user may select a displayed button of Next 1420. Responding to the selection of Next 1420, the master device activates its own NFC module, and can collect information of hearing-aids from the NFC tags.

Figure 14B:
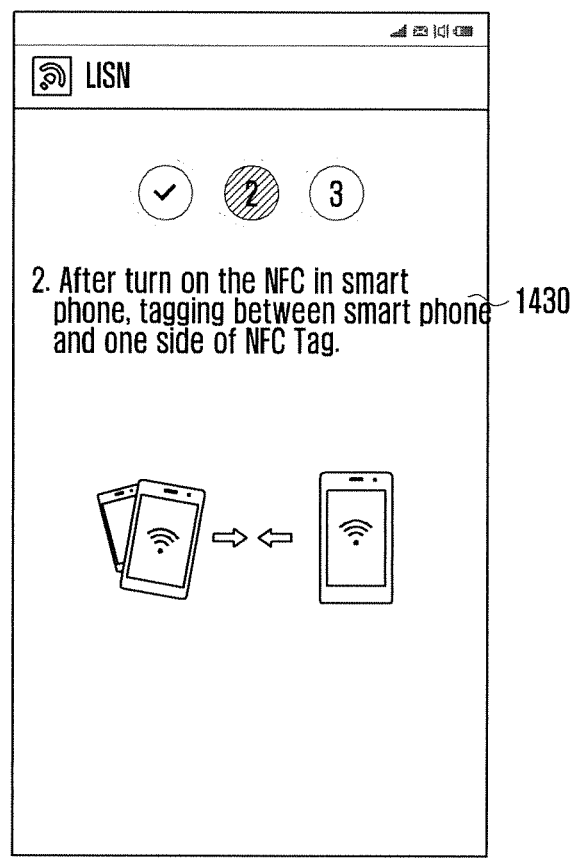

Referring to FIG. 14B, the master device can display a message 1430 indicating that the master device is currently performing a connection operation. Here, the NFC tag is an information providing device and can be installed in storage cases of the hearing-aids. Namely, if the user approaches the master device to the NFC tag attached to the case, the master device identifies the NFC tag, and reads tag information (i.e., information for connection with hearing-aids) from the NFC tag. The master device can perform connections with the hearing-aids by using the read information.

Figure 14C:
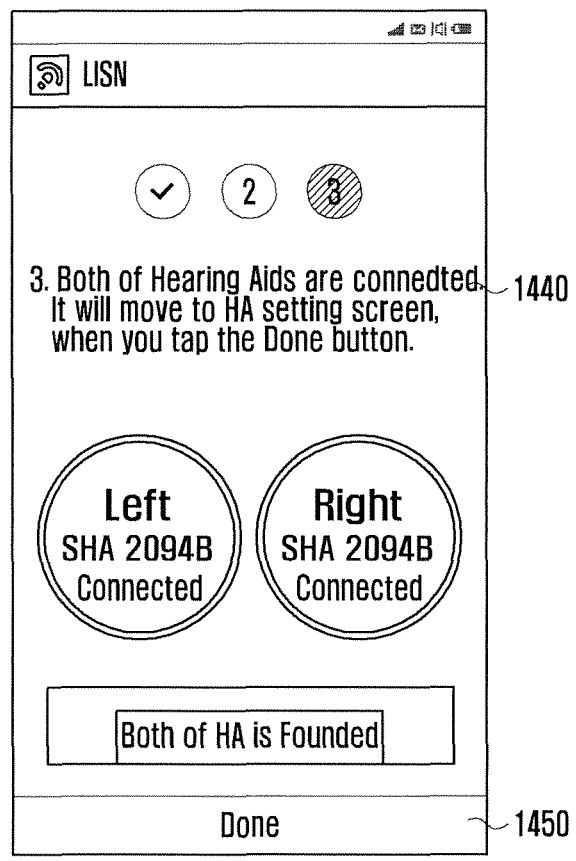

Referring to FIG. 14C, the master device can display a message 1440 indicating that the connections with the hearing-aids are completed and the hearing-aids can be controlled. The master device can identify a user selection of a Done button 1450.

Figure 14D:
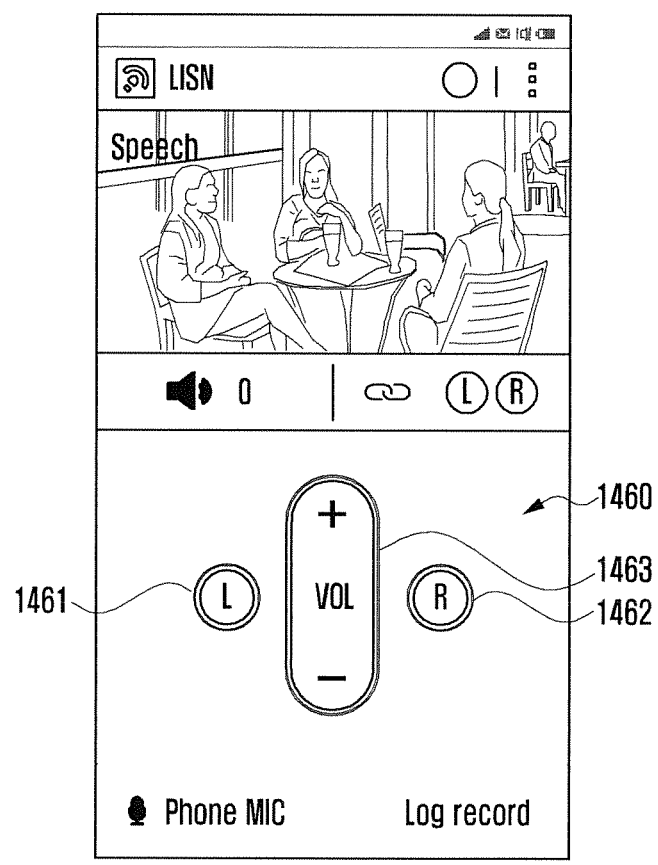

Referring to FIG. 14D, the master device can display a screen 1460 for controlling hearing-aids in response to a selection of the completion button. The control screen 1460 may include an "L" button 1461 for selecting a left hearing-aid, "R" button 1462 for selecting a right hearing-aid, and volume control button 1463 for adjusting the volume of a selected hearing-aid.

According to various embodiments of the present invention, a method for connecting to external devices by using a near-field wireless communication module in an electronic device may include obtaining external device information for connecting to the external devices, connecting to the external devices by using the obtained external device information, and controlling the connected external devices.

The operation of connecting to external devices may include operations of generating threads for connecting to the external devices by using the external device information and connecting to the external devices by simultaneously performing the threads.

The above method may further include classifying the external devices into a plurality of groups according to a predetermined criterion. The operation of generating threads may include individually generating control nodes in charge of the groups, finding an external device included in a group in charge by performing a scanning operation of the control nodes, and generating a thread for the external device found by the control nodes. The criterion may be a near-field communication type.

The above method may further include displaying a list of the external devices, classifying the external devices into a plurality of groups responding to a user input, and individually generating and storing identification information of the groups. The operation of generating threads may include generating a thread for a corresponding group selected by a user from the identification information.

The above method may further include classifying the external devices into a plurality of groups based on at least a portion of the external device information and individually generating and storing identification information of the groups. The operation of generating threads may include generating a thread for a corresponding group selected by a user from the identification information.

At least a portion of the external device information may include at least a portion of external device type information and location information.

The operation of classifying the external devices may be performed further based on location information obtained by the electronic device.

The location information may include location information calculated by using a GPS module installed in the electronic device.

The term "module" used in the present disclosure may refer to, for example, a unit including at least one combination of hardware, software, and firmware. The "module" may be interchangeably used with terms such as a unit, logic, logical block, component, and/or circuit. The "module" may be a minimum unit of an integrally configured article and/or a part thereof. The "module" may be a minimum unit performing at least one function and/or a part thereof. The "module" may be mechanically and/or electronically implemented. For example, the "module" according to the present disclosure may include at least one of an ASIC (Application-Specific Integrated Circuit) chip, FPGA (Field-Programmable Gate Arrays), and programmable-logic device for performing operations which has been known and/or are to be developed hereinafter.

According to various embodiments, at least some of the devices (for example, modules or functions thereof) or the method (for example, operations) according to the present disclosure may be implemented by a command stored in a computer-readable storage medium in a programming module form. When the instructions are executed by a processor, the processor may perform functions corresponding to the instructions. The computer-readable storage medium may be, for example, the storage unit 130. At least a portion of the programming module can be implemented by a processor. In order to perform at least one function, at least a portion of the programming module may include a module, program, routine, and set of instructions, The computer-readable recording medium may include magnetic media such as a hard disk, a floppy disk, and a magnetic tape, optical media such as a CD-ROM (Compact Disc Read Only Memory) and a DVD (Digital Versatile Disc), magneto-optical media such as a floptical disk, and hardware devices specially configured to store and perform a program instruction (for example, programming module), such as a ROM (Read Only Memory), RAM (Random Access Memory), flash memory and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

The module or program module according to various embodiments of the present invention may include at least one of the above components, omit some of them, or include additional components. Operations can be executed by the module, program module, or other components in a sequential, parallel, repeating, or heuristic method according to various embodiments of the present invention. Further, some operations may be executed in a different sequence or omitted, and some other operation may be added.

Embodiments and drawings described in the present disclosure are intended to present specific examples for easier understanding of the technical scope of the present invention, and don't limit the scope of present invention. Accordingly, it should be understood that the scope of various embodiments of the present invention include all the variations or modified forms induced from the technical spirit of the present invention.

The invention claimed is:

1. A method for connecting to external devices by using a near-field communication module in an electronic device, the method comprising:

obtaining external device information for connecting to the external devices, connecting to the external devices by using the obtained external device information, and controlling the connected external devices, wherein connecting to the external devices comprises:
generating threads for connecting to the external devices by using the external device information, and connecting to the external devices by simultaneously performing the threads.

2. The method of claim 1, further comprising:
classifying the external devices into a plurality of groups according to a predetermined criterion;
wherein generating threads comprises:
individually generating control nodes in charge of the groups,
finding an external device included in a group in charge by performing a scanning operation of the control nodes, and
generating a thread for the external device found by the control nodes.

3. The method of claim 2, wherein the criterion is a near-field communication type.

4. The method of claim 1, further comprising:
displaying a list of the external devices,
classifying the external devices into a plurality of groups in response to a user input, and
individually generating and storing identification information of the groups;
wherein generating threads comprises generating a thread for a corresponding group selected by a user from the identification information.

5. The method of claim 1, further comprising:
classifying the external devices into a plurality of groups based on at least a portion of the external device information, and
individually generating and storing identification information of the groups;
wherein generating threads comprises generating a thread for a corresponding group selected by a user from the identification information.

6. The method of claim 5, wherein at least a portion of the external device information comprises at least a portion of external device type information and location information.

7. The method of claim 5, wherein classifying the external devices is performed further based on location information obtained by the electronic device.

8. The method of claim 7, wherein the location information comprises location information calculated by using a GPS module installed in the electronic device.

9. An electronic device comprising:
a communication unit configured to perform a near-field communication with external devices directly or through a network;
a storage unit configured to store external device information for a connection with the external devices; and
a processor configured to control the communication unit and the storage unit, the processor is configured to:
obtain external device information from the storage unit or from an information providing device through the communication unit;

control the communication unit to connect to the external devices by using the obtained external device information; and control the connected external devices through the communication unit, wherein controlling the communication unit to connect to the external devices comprises:
generating threads for connecting to the external devices by using the external device information, and
connecting to the external devices by simultaneously performing the threads.

10. The electronic device of claim 9, wherein the processor comprises:
a grouping module configured to classify the external devices into a plurality of groups according to a predetermined criterion, and
a control module configured to individually generate control nodes in charge of the groups,
wherein the control nodes find an external device included in a group in charge by performing a scanning operation and generate a thread for the found external device.

11. The electronic device of claim 10, wherein the criterion is a near-field communication type.

12. The electronic device of claim 11, wherein the near-field communication type comprises at least one of a Bluetooth, Wi-Fi, and NFC (Near-Field Communication).

13. The electronic device of claim 9, further comprising:
an input unit configured to generate a user input, and
a display unit configured to display a list of the external devices,
wherein the processor comprises:
a grouping module configured to classify the external devices into a plurality of groups in response to a user input, and to individually generate and store identification information of the groups; and
a control module configured to generate a thread for a corresponding group selected by a user from the identification information.

14. The electronic device of claim 9, wherein the processor comprises:
a grouping module configured to classify the external devices into a plurality of groups based on at least a portion of the external device information, and to individually generate and store identification information of the groups, and
a control module configured to generate a thread for a corresponding group selected by a user from the identification information.

15. The electronic device of claim 14, wherein at least a portion of the external device information comprises at least a portion of external device type information and location information.

16. The electronic device of claim 14, wherein the grouping module classifies the external devices further based on location information obtained by the electronic device.

17. The electronic device of claim 16, further comprising:
a GPS module configured to receive information related to an altitude and latitude from GPS satellites,
wherein the location information is calculated from the received information related to the altitude and latitude.

* * * * *